United States Patent Office 3,574,190
Patented Apr. 6, 1971

3,574,190
PENICILLIN DERIVATIVES AND THEIR SALTS
Erkki Juhani Honkanen, Timo Kosunen, Joachim Ernst Alberty, and Jaakko Juhani Hukki, Helsinki, Finland, assignors to Laaketehdas Orion Oy, Helsinki, Finland
No Drawing. Filed May 12, 1969, Ser. No. 823,996
Int. Cl. C07d *99/16*
U.S. Cl. 260—239.1                                 28 Claims

ABSTRACT OF THE DISCLOSURE

Penicillins having the formula

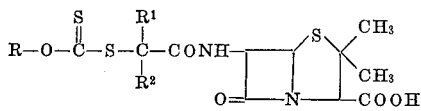

are prepared by reacting 6-aminopenicillanic acid or its salt with a specific reactive derivative of a carbonic acid.

---

The present invention resides in new penicillins having the general formula

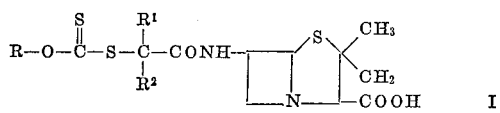

in which formula R stands for an alkyl, alkenyl, cycloalkyl, cycloalkylalkyl, aralkyl, alkoxyalkyl, aryloxyalkyl-, alkylthioalkyl, aminoalkyl or heterocyclic radical, $R^1$ stands for hydrogen or a methyl, phenyl or benzyl group, and $R^2$ stands for hydrogen or a methyl group, and salts of these penicillins.

Compounds according to the invention are characterized by high antibacterial effect. Many of the penicillins according to the invention have a bacteriostatic effect in vitro in the same order as Q-penicillin. This concerns both gram-positive bacteria such as *Staphylococcus aureus, Streptococcus faecalis, Streptococcus β-haemolyticus* and *Streptococcus pneumoniae*, and also gram-negative organisms such as *Proteus mirabilis, Klebsiella pneumoniae, Escherichia coil, Salmonella typhimurium, Salmonella typhosa, Salmonella paratyphi, Salmonella schottmuelleri* and *Salmonella enteritidis*.

With some of the penicillins according to the invention on intravenous administration to dogs a higher (by a factor of 1.5) content in the serum is obtained than with G-penicillin; on intramuscular administration the maximum content equals that with G-penicillin. It is to be noted that on intramuscular administration of compounds according to the invention high content in the serum is maintained much longer (depot effect) than when G-penicillin is used. This is clearly shown by the fact that the penicillin content of the serum six hours after administration is up to 50 times higher than that obtained when G-penicillin is used. Also on oral administration, some of the penicillins according to the invention produce in dogs higher content in the serum than do G-penicillin and V-penicillin (up to four times that with V-penicillin). This clearly demonstrates that the penicillins according to the invention possess good acid stability.

Therapeutic experiments with mice have shown that the effect of some of the penicillins according to the invention on streptococci on subcutaneous administration is about four times that of G-penicillin. On oral administration, the effect is up to eight times that of V-penicillin.

The method for manufacturing said penicillins and their salts is characterized in that 6-aminopenicillanic acid or its salt is made to react in a manner previously known in itself with a reactive derivative, such as a halide, mixed anhydride or carbondi-imide, of a carbonic acid having the following general formula:

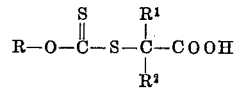

and that, when desired, the compound corresponding to the general Formula I thus obtained is converted into a salt with the aid of an inorganic or organic base.

One possible procedure (Method A) for manufacturing new penicillins according to the general Formula I is based on dissolving a carbonic acid having the general Formula II into a non-reactive, water-free but water-miscible solvent such as dioxane, and adding to this solution dicyclohexylcarbodiimide in the same solvent. To this reaction mixture the aqueous solution of 6-aminopenicillanic acid and a tertiary amine, such as triethylamine, is then added. Upon termination of the reaction, water is added and the dicyclohexylcarbamide which is then precipitated is filtered off. From the filtrate penicillin is liberated with a dilute mineral acid and extracted with a solvent not miscible with water, such as methylene chloride. The penicillin presented in the form of a free acid is then converted by base treatment to the desired metal or amine salt.

In case the substituent R in the carbonic acid according to the general Formula II contains a tertiary amino group (see Example 3), it is advantageous to slightly modify the method described above. The reaction of the acid with dicyclohexylcarbodiimide is now accomplished in dimethylformamide, and as starting material for penicillin formation the potassium salt of 6-aminopenicillanic acid is used.

Another procedure (Method B) for manufacturing new penicillins consists in that a carbonic acid according to the general Formula II is at first converted, e.g. by treatment with thionyl chloride, into an acid chloride, with which the 6-aminopenicillanic acid is then acylated. For this purpose, the acid chloride is dissolved in a water-free but water-miscible solvent such as dioxane, and to this solution the cooled water-dioxane solution of 6-aminopenicillanic acid and triethylamine is then added. The reaction product is extracted at pH 2–3 with a suitable solvent such as methylene chloride and converted to the desired salt.

One possible procedure (Method C) for manufacturing penicillins according to the general Formula I comprises acylation of 6-aminopenicillanic acid with a mixed anhydride, which is prepared by reacting a carbonic acid according to the general Formula II with some chloroformic acid ester such as ethylchloroformate. The preparation of the mixed anhydride is advantageously performed in a solvent such as tetrahydrofuran or dimethylformamide, in the presence of triethylamine. Upon termination of the reaction, the water-tetrahydrofuran or water-dimethylformamide solution of 6-aminopenicillanic acid and triethylamine is added. The formation of penicillin takes place at 0° in 2 hours.

The carbonic acids used as starting materials are xanthogencarbonic acids having the general Formula II and substituted in various ways. Of these, methyl- and ethylxanthogenacetic acid [Holmberg, J. pr. (2)71,273,-266 (1905)], neopentylxanthogenacetic acid [Johansson, Arkiv Kem. Min. Geol. 22B (1946)] and α-ethylxanthogen-β-phenylpropionic acid [Biilman and Madsen, Ann. 402,338 1913)] have previously been described in literature.

The xanthogencarbonic acids are synthetized, starting with suitable potassium xanthogenates and halogen carbonic acids. Since many of the xanthogencarbonic acids are oily or not easily crystallizable compounds, their crude products are purified merely by dissolving in sodium bicarbonate solution, extraction with ether and precipitation with acid.

The following examples illustrate the invention in greater detail.

EXAMPLE 1 (METHOD A)

Potassium salt of 6-ethylxanthogenacetamidopenicillanic acid

To a solution containing 1.80 g. (0.01 mole) ethylxanthogenacetic acid (prepared from potassium ethylxanthogenate and chloroacetic acid) in 25 ml. of anhydrous dioxane, there were added at 5–10° C. under agitation 2.1 g. (0.01 mole) dicyclohexylcarbodiimide in 10 ml. of dioxane. Agitation was continued for 5 minutes, whereupon to the reaction product was added a solution containing 2.16 g. (0.01 mole) 6-aminopenicillanic acid in 10 ml. of water and 1.5 ml. of triethylamine. After mixing for 2 hours at 5° C., 50 ml. of water were added and the precipitated dicyclohexylcarbamide was filtered off. The cooled filtrate was acidified to pH 2–3 and extracted twice with 50 ml. of methylene chloride. The methylene chloride solution was dried with sodium sulphate and concentrated in vacuum to 10 ml., whereupon 5 ml. of 2-molar n-butanol solution of potassium-2-ethyl hexanoate were added. Adding of absolute ether (300–400 ml.) caused separation from the solution of the potassium salt of the penicillin, which was filtered, washed with ether and carefully dried at room temperature in vacuum. The yield was 3.2 g. (77%), M.P. 183° C. The purity according to infrared spectrophotometric examination, using a benzylpenicillin standard for reference material, was 92%.

$C_{13}H_{17}N_2O_5S_3K$—Calc.: S, 23.09%. Found: S, 22.34%.

EXAMPLE 2 (METHOD A)

Potassium salt of 6-neopentylxanthogenacetamidopenicillanic acid

To a solution containing 33.3 g. (0.15 mole) neopentylxanthogenacetic acid (prepared from potassium neopentylxanthogenate and chloroacetic acid) in 250 ml. of dry dioxane there were added at 5–10° C. under agitation 31.5 g. (0.15 mole) dicyclohexylcarbodiimide in 100 ml. of dioxane, After agitation for 5 minutes, a solution was added, containing 32.4 g. (0.15 mole) of 6-aminopenicillanic acid in 150 ml. water and in 22.5 ml. triethylamine. After mixing for 2 hours at 5° C., 500 ml. water were added and the precipitated dicyclohexylcarbamide was filtered off. The cooled filtrate was acidified to pH 2–3 and extracted twice with 250 ml. of methylene chloride. The solution was dried and concentrated, whereupon to it were added 75 ml. of 2-molar potassium-2-ethyl hexanoate solution. The potassium salt of penicillin was precipitated with ether (2000 ml), filtered and dried. Yield: 55.0 g. (81.5%). The penicillin content was 93%, M.P. 217° C.

$C_{16}H_{23}N_2O_5S_3K$—Calc. (percent): C, 41.89; H, 5.05; N, 6.11; S, 20.97. Found (percent): C, 42.03; H, 5.05; N, 6.42; S, 20.37.

Below follow some new penicillins according to the general Formula I, which were manufactured from appropriate xanthogencarbonic acids by letting them react with 6-aminopenicillanic acid according to Method A:

Potassium salt of 6-methylxanthogenacetamidopenicillanic acid, M.P. 190° C.—The methylxanthogenacetic acid used as initial material was prepared from potassium methylxanthogenate and chloroacetic acid [cf. Holmberg, J. pr. (2)71,273 (1905)]

Potassium salt of 6-(n-propylxanthogenacetamido)penicillanic acid, M.P. 195° C.—The n-propylxanthogenacetic acid used as initial material, M.P. 43–5° C., was prepared from potassium n-propylxanthogenate and chloroacetic acid.

Potassium salt of 6-(i-propylxanthogenacetamido)penicillanic acid, M.P. 190° C.—The i-propylxanthogenacetic acid used as initial material, M.P. 125–8° C., was prepared from potassium i-propylxanthogenate and chloroacetic acid.

Potassium salt of 6-(n-butylxanthogenacetamido)penicillanic acid, M.P. 187° C.—The n-butylxanthogenacetic acid used as initial material, a yellow, viscous oil, was prepared from potassium n-butylxanthogenate and chloroacetic acid.

Potassium salt of 6-(n-pentylxanthogenacetamido)penicillanic acid, M.P. 175° C.—The n-pentylxanthogenacetic acid used as initial material, a yellow, viscous oil, was prepared from potassium n-pentylxanthogenate and chloroacetic acid.

Potassium salt of 6-(n-octylxanthogenacetamido)penicillanic acid, M.P. 189° C.—The n-octylxanthogenic acetic acid used as initial material, a yellow, viscous oil, was prepared from potassium n-octylxanthogenate and chloroacetic acid.

Potassium salt of 6-(n-tetradecylxanthogenacetamido)penicillanic acid, M.P. 195° C.—The n-tetradecylxanthogenacetic acid, M.P. 29–310 C., was prepared from potassium n-tetradecylxanthogenate and chloroacetic acid.

Potassium salt of 6-allylxanthogenacetamidopenicillanic acid, M.P. 210° C.—The allylxanthogenacetic acid used as initial material, M.P. 68–70° C., was prepared from potassium allylxanthogenate and chloroacetic acid.

Potassium salt of 6-(2-methylcyclohexylxanthogenacetamido)penicillanic acid, M.P. 197° C.—The 2-methylcyclohexylxanthogenacetic acid, a yellow, viscous oil, was prepared from potassium 2-methylcyclohexylxanthogenate and chloroacetic acid.

Potassium salt of 6-(4-methylcyclohexylxanthogenacetamido)penicillanic acid, M.P. 196° C.—The 4-methylcyclohexylxanthogenacetic acid, a yellow, viscous oil, was prepared from potassium 4-methylcyclohexylxanthogenate and chloroacetic acid.

Potassium salt of 6-(3,3,5-trimethylcyclohexylxanthogenacetamido)penicillanic acid, M.P. 184° C.—The 3,3,5-trimethylcyclohexylxanthogenacetic acid used as initial material, a yellow, viscous oil, was prepared from potassium 3,3,5-trimethylcyclohexylxanthogenate and chloroacetic acid.

Potassium salt of 6-cyclohexylmethylxanthogenacetamidopenicillanic acid, M.P. 209° C.—The cyclohexylmethylxanthogenacetic acid used as initial material, a yellow, viscous oil, was prepared from potassium cyclohexylmethylxanthogenate and chloroacetic acid.

Potassium salt of 6-(1-adamantylmethylxanthogenacetamido)penicillanic acid, M.P. 183° C.—The 1-adamantylmethylxanthogenacetic acid used as initial material, M.P. 151–2° C., was prepared from potassium 1-adamantylmethylxanthogenate and chloroacetic acid.

Potassium salt of 6-benzylxanthogenacetamidopenicillanic acid, M.P. 183° C.—The benzylxanthogenacetic acid used as initial material, M.P. 71–4° C., was prepared from potassium benzylxanthogenate and chloroacetic acid.

Potassium salt of 6-[(2-ethoxyethyl)xanthogenacetamido]penicillanic acid, M.P. 175° C.—The (2-ethoxyethyl)xanthogenacetic acid used as initial material, a yellow, viscous oil, was prepared from potassium (2-ethoxyethyl)xanthogenate and chloroacetic acid.

Potassium salt of 6-[(2-phenoxyethyl)xanthogenacetamido]penicillanic acid, M.P. 181° C.—The (2-phenoxyethyl)xanthogenacetic acid used as initial material, M.P. 97–9° C., was prepared from potassium (2-phenoxyethyl)-xanthogenate and chloroacetic acid.

Potassium salt of 6-[(2-methylthiethyl)xanthogenacetamido]penicillanic acid, M.P. 186° C.—The (2-methylthioethyl)xanthogenacetic acid used as initial material, M.P. 81–3° C., was prepared from potassium (2-methylthioethyl)xanthogenate and chloroacetic acid.

Potassium salt of 6-furfurylxanthogenacetamidopenicillanic acid, M.P. 177° C.—The furfuylxanthogenacetic acid used as initial material, a yellow, viscous oil, was prepared from potassium furfurylxanthogenate and chloroacetic acid.

Potassium salt of 6-(2-tetrahydropyranylmethylxanthogenacetamido)penicillanic acid, M.P. 203° C.—The 2-tetrahydropyranylmethylxanthogenacetic acid used as initial material, a yellow, viscous oil, was prepared from potassium 2-tetrahydropyranylmethylxanthogenate and chloroacetic acid.

Potassium salt of 6-(α-neopentylxanthogenpropionamido)penicillanic acid, M.P. 213° C.—The α-neopentylxanthogenpropionic acid used as initial material, M.P. 65–8° C., was prepared from potassium neopentylxanthogenate and α-bromopropionic acid.

Potassium salt of 6-(α-ethylxanthogenphenylacetamido)penicillanic acid, M.P. 135° C.—The α-ethylxanthogenphenylacetic acid used as initial material, a yellow, viscous oil, was prepared from potassium ethylxanthogenate and α-bromophenylacetic acid.

Potassium salt of 6-(α-ethylxanthogen-β-phenylpropionamido)-penicillanic acid, M.P. 170° C.—The α-ethylxanthogen-β-phenylpropionic acid used as initial material, M.P. 89–90° C., was prepared from potassium ethylxanthogenate and α-bromo-β-phenylpropionic acid [cf. Biilman and Madsen, Ann. 402,338 (1913)].

EXAMPLE 3 (METHOD A, MODIFIED)

Potassium salt of 6-(2-piperidinoethylxanthogenic acetamido)penicillanic acid 2.63 g. (0.01 mole) of 2-piperidinoethylxanthogenic acid were dissolved in 25 ml. of dimethyl formamide. To this was added at 0° C. a solution containing 2.1 g. (0.01 mole) of dicyclohexylcarbodiimide in 5 ml. of dimethyl formamide. After 5 minutes there were added 2.54 g. (0.01 mole) of the potassium salt of 6-aminopenicillanic acid in 10 ml. of water, followed by agitation at 5–10° C. for 2 hours. After addition of 50 ml. of water, the precipitated dicyclohexylcarbamide was filtered off and the filtrate was concentrated in vacuum at a temperature below 20° C. The potassium salt of penicillin was precipitated with absolute ether, filtered, and dried. Yield: 4.3 g. (86%), M.P. 160° C.

The 2-piperidinoethylxanthogenacetic acid, a semisolid mass, was prepared from potassium 2-piperidinoethylxanthogenate and chloroacetic acid.

According to the modified method A there was furthermore manufactured:

Potassium salt of 6-(1-methyl-3-piperidylxanthogenacetamido)penicillanic acid, M.P. 220° C.—The 1-methyl-3-piperidylxanthogenacetic acid used as initial material, M.P. 138–9° C., was prepared from potassium-1-methyl-3-piperidylxanthogenate and chloroacetic acid.

EXAMPLE 4 (METHOD B)

Potassium salt of 6-ethylxanthogenacetamido-penicillanic acid

A mixture of 1.80 g. (0.01 mole) of ethylxanthogenacetic acid and 10 ml. of thionylchloride was heated for 2 hours on a water bath under a reflux cooler. The excess thionylchloride was evaporated in vacuum and the residue was twice evaporated, until dry, with anhydrous benzene. The acid chloride thus obtained was dissolved in 10 ml. of dioxane and to this was added, gradually and under agitation, a cooled solution containing 2.16 g. (0.01 mole) of 6-aminopenicillanic acid in 10 ml. water, in 20 ml. dioxane and in 3.0 ml. triethylamine. After mixing for 2 hours, water and dilute hydrochloric acid were added until the pH was 2–3. The mixture was twice extracted with methylene chloride. Upon drying and concentrating the methylene chloride solution, 5 ml. of 2-molar potassium 2-ethylhexanoate solution were added to it. The potassium salt of penicillin thus produced was precipitated with ether, filtered and dried. The yeld was 3.3 g. (79%). The penicillin content was 70%.

In analogy with the preceding there was manufactured:
Potassium salt of 6-(α-neopentylxanthogenisobutyrami-do)penicillanic acid, M.P. 221° C.—The α-neopentylxanthogenisobutyric acid used as initial material, M.P. 106–8° C., was prepared from potassium neopentylxanthogenate and α-bromoisobutyric acid.

EXAMPLE 5 (METHOD C)

Potassium salt of 6-ethylxanthogenacetamido-penicillanic acid

A solution containing 1.80 g. (0.01 mole) of ethylxanthogenacetic acid and 1.5 ml. triethylamine in 25 ml. of tetrahydrofuran (or dimethylformamide) was cooled to between —40 and —50° C., and to it was added under agitation 1.1 g. (0.01 mole) of ethyl chloroformate in 10 ml. of tetrahydrofuran. After 5 minutes a cooled solution was added, containing 2.16 g. (0.01 mole) of 6-aminopenicillanic acid and 1.5 ml. triethylamine in 10 ml. water and in 10 ml. tetrahydrofuran. Following mixing for 2 hours at 0° C., the pH of the solution was adjusted to 2–3 and the liberated penicillin was extracted with methylene chloride. After drying and concentrating the methylene chloride solution, 5 ml. of 2-molar potassium 2-ethylhexanoate solution were added to it. The yield of precipitated potassium salt of penicillin was 2.3 g. (55%). The penicillin content was 61%.

We claim:
1. Penicillins of the formula

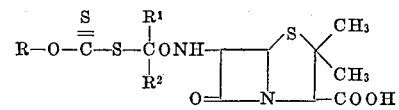

and potassium salts thereof, wherein:
R is a member selected from the group consisting of alkyl having 1–14 carbon atoms, allyl, cyclohexyl having 1–3 methyl substituents, cyclohexylmethyl, 1-adamantylmethyl, benzyl, 2-ethoxyethyl, 2-phenoxyethyl, 2-methylthioethyl, furfuryl, tetrahydropyranylmethyl, 2-piperidinoethyl and 1-methyl-3-piperidyl;
$R^1$ is a member selected from the group consisting of hydrogen, methyl, phenyl and benzyl;
$R^2$ is a member selected from the group consisting of hydrogen and methyl.

2. A potassium salt in accordance with claim 1 which is the potassium salt of 6-methylxanthogenacetamidopenicillanic acid.

3. A potassium salt in accordance with claim 1 which is the potassium salt of 6-ethylxanthogenacetamidopenicillanic acid.

4. A potassium salt in accordance with claim 1 which is the potassium salt of 6-(n-propylxanthogenacetamido)penicillanic acid.

5. A potassium salt in accordance with claim 1 which is the potassium salt of 6-(i-propylxanthogenacetamido)penicillanic acid.

6. A potassium salt in accordance with claim 1 which is the potassium salt of 6-(n-butylxanthogenacetamido)penicillanic acid.

7. A potassium salt in accordance with claim 1 which is the potassium salt of 6-(n-pentylxanthogenacetamido)penicillanic acid.

8. A potassium salt in accordance with claim 1 which is the potassium salt of 6-neopentylxanthogenacetamido-penicillanic acid.

9. A potassium salt in accordance with claim 1 which is the potassium salt of 6-(n-octylxanthogenacetamido)penicillanic acid.

10. A potassium salt in accordance with claim 1 which is the potassium salt of 6-(n-tetradecylxanthogenacetamido)penicillanic acid.

11. A potassium salt in accordance with claim 1 which is the potassium salt of 6-allylxanthogenacetamidopenicillanic acid.

12. A potassium salt in accordance with claim 1 which is the potassium salt of 6-(2-methylcyclohexylxanthogenacetamido)penicillanic acid.

13. A potassium salt in accordance with claim 1 which is the potassium salt of 6-(4-methylcyclohexylxanthogenacetamido)penicillanic acid.

14. A potassium salt in accordance with claim 1 which is the potassium salt of 6-(3,3,5-trimethylcyclohexylxanthogenacetamido)penicillanic acid.

15. A potassium salt in accordance with claim 1 which is the potassium salt of 6-cyclohexylmethylxanthogenacetamidopenicillanic acid.

16. A potassium salt in accordance with claim 1 which is the potassium salt of 6-(1-adamantylmethylxanthogenacetamido)penicillanic acid.

17. A potassium salt in accordance with claim 1 which is the potassium salt of 6-benzylxanthogenaectamidopenicillanic acid.

18. A potassium salt in accordance with claim 1 which is the potassium salt of 6[(2-ethoxyethyl)xanthogenacetamido]penicillanic acid.

19. A potassium salt in accordance with claim 1 which is the potassium salt of 6-[(2-phenoxyethyl)xanthogenacetamido]penicillanic acid.

20. A potassium salt in accordance with claim 1 which is the potassium salt of 6-[(2-methylthioethyl)xanthogenacetamido]penicillanic acid.

21. A potassium salt in accordance with claim 1 which is the potassium salt of 6-furfurylxanthogenacetamidopenicillanic acid.

22. A potassium salt in accordance with claim 1 which is the potassium salt of 6-(2-tetrahydropyranylmethylxanthogenacetamido)penicillanic acid.

23. A potassium salt in accordance with claim 1 which is the potassium salt of 6-(2-piperidinoethylxanthogenacetamido)penicillanic acid.

24. A potassium salt in accordance with claim 1 which is the potassium salt of 6-(1-methyl-3-piperidylxanthogenacetamido)penicillanic acid.

25. A potassium salt in accordance with claim 1 which is the potassium salt of 6-($\alpha$-ethylxanthogenphenylacetamido)penicillanic acid.

26. A potassium salt in accordance with claim 1 which is the potassium salt of 6-($\alpha$-neopentylxanthogenpropionamido)penicillanic acid.

27. A potassium salt in accordance with claim 1 which is the potassium salt of 6-($\alpha$-ethylxanthogen-$\beta$-phenylpropionamido)penicillanic acid.

28. A potassium salt in accordance with claim 1 which is the potassium salt of 6-($\alpha$-neopentylxanthogenisobutyramido)penicillanic acid.

References Cited
UNITED STATES PATENTS 3,449,325   6/1969   Nahm et al. _____ 260—239.1

NICHOLAS S. RIZZO, Primary Examiner

U.S. Cl. X.R.

424—271